United States Patent
Sulzer et al.

(10) Patent No.: US 9,658,088 B2
(45) Date of Patent: May 23, 2017

(54) FLOW MEASURING DEVICE, MEASURING TUBE AS WELL AS METHOD FOR MANUFACTURE OF A FLOW MEASURING DEVICE

(71) Applicant: Endress + Hauser Flowtec AG

(72) Inventors: Thomas Sulzer, Basel (CH); Patrick Oudoire, South (FR)

(73) Assignee: Endress + Hauser Flowtec AG, Reinach (CH)

( * ) Notice: Subject to any disclaimer, the term of this patent is extended or adjusted under 35 U.S.C. 154(b) by 251 days.

(21) Appl. No.: 14/389,858

(22) PCT Filed: Mar. 19, 2013

(86) PCT No.: PCT/EP2013/055615
§ 371 (c)(1),
(2) Date: Oct. 1, 2014

(87) PCT Pub. No.: WO2013/149818
PCT Pub. Date: Oct. 10, 2013

(65) Prior Publication Data
US 2015/0053019 A1 Feb. 26, 2015

(30) Foreign Application Priority Data
Apr. 5, 2012 (DE) .......... 10 2012 102 979

(51) Int. Cl.
*G01F 1/58* (2006.01)
*G01F 15/00* (2006.01)

(52) U.S. Cl.
CPC .............. *G01F 1/588* (2013.01); *G01F 1/586* (2013.01); *G01F 15/006* (2013.01)

(58) Field of Classification Search
CPC .......... G01F 1/586; G01F 15/006; G01F 1/588
USPC ............... 73/861.12, 861.13, 861.11, 861.08
See application file for complete search history.

(56) References Cited

U.S. PATENT DOCUMENTS

| | | | |
|---|---|---|---|
| 4,548,078 A | 10/1985 | Bohrer | |
| 4,555,939 A | 12/1985 | Bohrer | |
| 6,672,154 B1 | 1/2004 | Yamagishi et al. | |
| 6,768,291 B2 * | 7/2004 | Isogai | G01F 1/6845 324/71.1 |
| 8,347,731 B2 | 1/2013 | Genosar | |
| 2002/0007678 A1 * | 1/2002 | Ueyanagi | G01P 1/023 73/514.33 |

(Continued)

FOREIGN PATENT DOCUMENTS

| | | |
|---|---|---|
| CN | 1041036 A | 4/1990 |
| CN | 1358271 A | 7/2002 |

(Continued)

OTHER PUBLICATIONS

English Translation of the International Preliminary Report on Patentability, WIPO, Geneva, CH, Oct. 16, 2014.
(Continued)

*Primary Examiner* — Lisa Caputo
*Assistant Examiner* — Philip Cotey
(74) *Attorney, Agent, or Firm* — Bacon & Thomas, PLLC

(57) ABSTRACT

A flow measuring device having a line section serving for guiding a flowable medium, wherein the line section is formed at least partially by a cavity in a circuit board.

15 Claims, 1 Drawing Sheet

(56) References Cited

U.S. PATENT DOCUMENTS

| | | |
|---|---|---|
| 2004/0163463 A1* | 8/2004 | Ito .................. G01F 1/6845 |
| | | 73/204.26 |
| 2005/0066747 A1 | 3/2005 | Sobek |
| 2006/0144160 A1* | 7/2006 | Ketelsen ............ G01F 1/588 |
| | | 73/861.12 |
| 2009/0126505 A1 | 5/2009 | Shiraki |
| 2009/0194831 A1 | 8/2009 | Casey |
| 2009/0277278 A1* | 11/2009 | Koudal ............. G01F 1/8431 |
| | | 73/861.08 |
| 2010/0187557 A1* | 7/2010 | Samoilov ........... H01L 27/144 |
| | | 257/99 |

FOREIGN PATENT DOCUMENTS

| | | |
|---|---|---|
| EP | 0156271 A1 | 10/1985 |
| EP | 1930701 A1 | 6/2008 |
| FR | 2451022 | 10/1980 |
| GB | 2403016 A | 12/2004 |
| WO | 2009089392 A1 | 8/2009 |
| WO | 2009097549 A1 | 8/2009 |
| WO | 2009124875 A1 | 10/2009 |

OTHER PUBLICATIONS

German Search Report, German PTO, Munich, Nov. 19, 2012.
International Search Report, EPO, The Netherlands, Jun. 20, 2013.

* cited by examiner

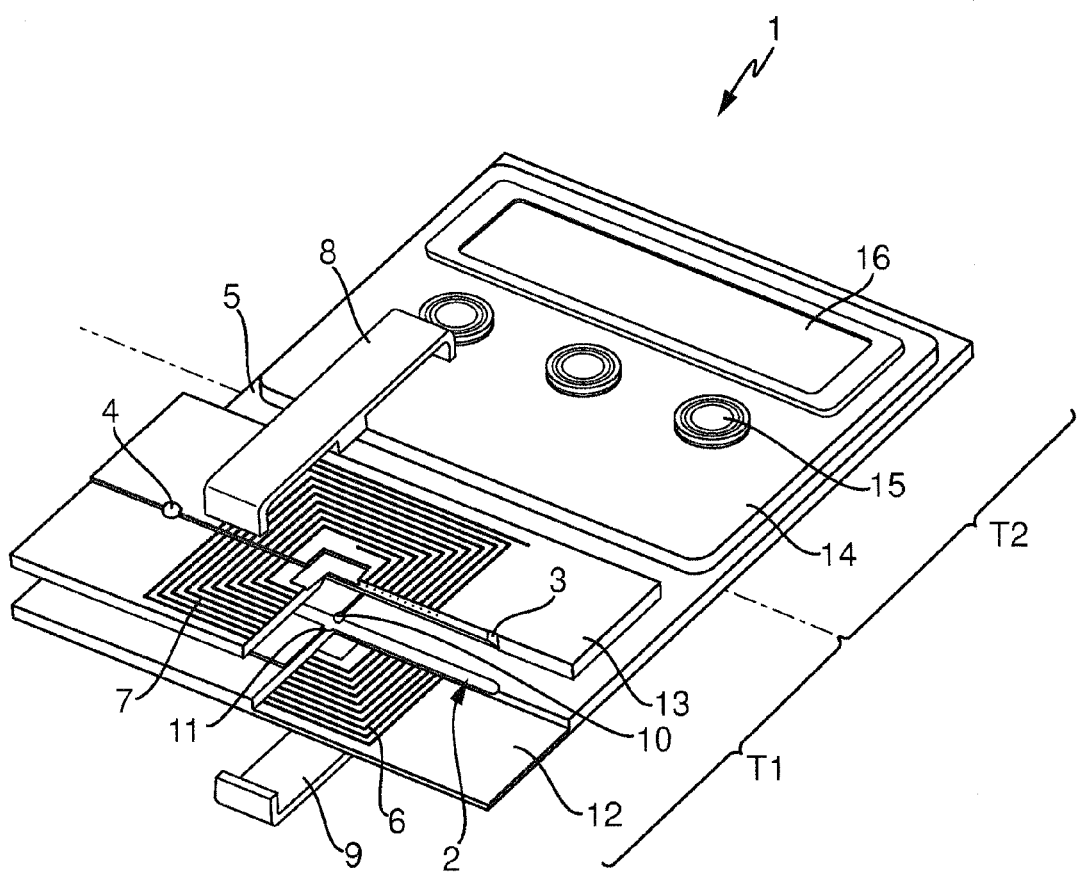

FLOW MEASURING DEVICE, MEASURING TUBE AS WELL AS METHOD FOR MANUFACTURE OF A FLOW MEASURING DEVICE

TECHNICAL FIELD

The present invention relates to a flow measuring device, to a measuring tube as well as to a method for manufacture of a flow measuring device.

BACKGROUND DISCUSSION

Flow measuring devices are widely used, especially in process automation technology. For example, magneto inductive flow measuring devices utilize for volumetric flow measurement the principle of electrodynamic induction and are known from a large number of publications. Thus (German laid-open application) Offenlegungsschrift DE 10347890 A1 discloses a magneto inductive flow measuring device with a measuring tube formed of layers of fiber composite materials. In such case, parts of the magneto inductive measuring device are formed completely or partially by layers of fiber composite materials or embedded in layers of fiber composite materials. These magneto inductive measuring devices have a nominal diameter of 6 to 2000 mm, in order also to be able to measure larger flow quantities.

SUMMARY OF THE INVENTION

An object of the present invention is to be able reliably to determine also smaller flow quantities.

This object is achieved according to the invention by a flow measuring device, a measuring tube for a flow measuring device and a method for manufacture of a flow measuring device.

As regards the flow measuring device, the object is achieved by a flow measuring device having a line section serving for guiding a flowable medium, wherein the line section is formed at least partially by a cavity in a circuit board.

Thus a flow measuring device is provided, in the case of which the line section is composed at least partially by a cavity in a circuit board.

In an embodiment of the flow measuring device, a measuring path serving for registering a chemical and/or physical measured variable is integrated into the line section. The measuring path can be the measuring path of a magneto inductive flow measuring device, an ultrasonic flow measuring device or a flow measuring device based on some other measuring principle.

In an additional embodiment of the flow measuring device, the line section is formed at least partially of a cavity extending on or in the circuit board, preferably in the form of an at least sectionally closed and/or open channel in the circuit board.

In an additional embodiment of the flow measuring device, the line section is formed partially of an elongated opening in the circuit board. The cavity can thus be a hole or channel extending through the circuit board for guiding the measured material.

In an additional embodiment of the flow measuring device, the line section is composed essentially of the circuit board, respectively of the material of the circuit board. The circuit board is composed, in such case, of a polyamide, an epoxide or an epoxide containing glass fibers.

In an additional embodiment of the flow measuring device, a coating is applied on a wall of the circuit board bounding the cavity, in order preferably to seal the circuit board, respectively the material of the circuit board, against the medium flowing through the line section. The cavity and thus also the line section can, in such case, be milled into the circuit board. The wall of the cavity, respectively of the line section, can then be coated. For this, for example, a coating such as parylene can be used.

In an additional embodiment of the flow measuring device, the circuit board is a multilayer circuit board, in the case of which conductive traces are applied on a plurality of layers of the circuit board. In such case, the different components of the measuring system can be arranged in/on different layers, i.e. plies, of the circuit board. In such case, it is also possible to arrange a number of circuit boards on top of one another, which each have different components of the measuring system. Thus it is possible, for example, to arrange the magnet system of a magneto inductive flow measuring device on different plies of the circuit board or different circuit boards. In a middle position between the two magnet systems, the electrodes can be arranged, in order to register a voltage induced in the measured material.

In an additional embodiment of the flow measuring device, an operating electronics can be arranged on the circuit board for operating the flow measuring device. The operating electronics can serve, in such case, for performing the functions of the flow measuring device, such as, for example, registering the measured variable. The operating electronics can serve, furthermore, to transduce the measured variable into a measurement signal corresponding to the measured variable. Because the operating electronics as well as also the line section are arranged on a single circuit board, a compact construction of a flow measuring device is achieved.

In an additional embodiment of the flow measuring device, the circuit board is modularly constructed and includes a first module, on which the operating electronics is arranged. Furthermore, the circuit board includes a second module, which is electrically and/or mechanically connectable with the first module and on which the line section is located. In this way, a flow measuring device having an exchangeable line section can be produced.

In an additional embodiment of the flow measuring device, the flow measuring device is a magneto inductive flow measuring device. On the circuit board, preferably on the second module of the circuit board, a magnet system can be provided, which is composed preferably of planar coils. The magnet system can serve to induce a voltage in the medium flowing through the line section during operation of the flow measuring device.

In an additional embodiment of the flow measuring device, at least two measuring electrodes are provided on the circuit board, preferably the second module of the circuit board, or between two layers of the circuit board, preferably between two layers of the second module of the circuit board. These two electrodes can serve to tap a voltage induced in the medium. The electrodes can be medium contacting electrodes as well as also medium non-contacting electrodes in the case of a so-called capacitive, magneto inductive flow measuring device.

In an additional embodiment of the flow measuring device, the circuit board has a front side and a rear side, wherein on the front side and/or rear side electrical and/or electronic components are secured, and wherein the cavity forming the line section extends essentially in a plane parallel to a plane of the front side, respectively rear side.

In an additional embodiment of the flow measuring device, an inlet and a drain are provided preferably on the second module of the flow measuring device, in order to introduce the medium into the line section, respectively to drain the medium from the line section. Inlet and drain can, in such case, be arranged on the same side, for example, the front side of the circuit board.

In an additional embodiment of the flow measuring device, the line section is formed of a plurality of circuit boards, wherein in a first circuit board a first cavity and on a second circuit board a second cavity are provided, wherein the first and second circuit boards are connected or are connectable in such a manner that a line section is formed, which serves for guiding the medium.

In an additional embodiment of the flow measuring device, the first and the second circuit boards form shell shaped cavities, from which the line section is composed.

In this way, a line section with a circularly shaped or a rectangularly shaped cross section can be formed, whose walls are provided by the first and second circuit boards. To this end, cavities can be milled into the first and second circuit boards.

As regards the method, the object is achieved by a method for manufacture of a line section for a flow measuring device, which line section serves to guide a flowable medium, wherein a cavity is formed in a circuit board, which cavity is used as a line section, in order to guide the flowable medium.

As regards the measuring tube, the object is achieved by a measuring tube for a flow measuring device, which measuring tube includes a line section, which is formed at least partially by a cavity in a circuit board.

There is thus provided by the present invention a flow measuring device, which is essentially composed of a circuit board. Arranged on the circuit board can thus be both the operating electronics as well as also a measurement channel guiding the medium. In this case, no supplemental measuring tube is required for guiding the medium. Rather, according to the invention, the circuit board is utilized for guiding the medium. A small, thin, flow measuring device results, which has advantages especially in the case of small nominal diameters. The flow measuring device has, thus, a thickness of one circuit board or in the case of a plurality of circuit boards then a corresponding number of circuit board thicknesses. The proposed flow measuring device is, thus, applicable especially for use in sterile regions, such as hospitals, for example, in the case of blood transfusions. On the other hand, also laboratory applications are possible, for example, in experimental fields for experimental setups and control measurements.

BRIEF DESCRIPTION OF THE DRAWINGS

The invention will now be explained in greater detail based on the appended drawing, the sole FIGURE of which shows as follows:

FIG. 1 is a schematic representation of a form of embodiment of the proposed invention.

DETAILED DISCUSSION IN CONJUNCTION WITH THE DRAWINGS

FIG. 1 shows a flow measuring device 1, which is composed essentially of a circuit board 5. Arranged in a first territory T1 of this circuit board 5 is the line section 2 for guiding the medium. Arranged in a second territory T2 of the circuit board 5 is an interaction apparatus 15, 16. Beneath the interaction apparatus 15, 16 is located an operating electronics 14, which executes or controls the functions of the flow measuring device 1.

The first territory T1 includes a measuring arrangement 6, 7, 8, 9, 10, 11 for the magneto inductive determination of the flow. Provided in the circuit board 5 is a cavity or line section 2 for guiding the medium. The medium is brought through inlet and drain 3, 4 into and out of the line section 2. Provided in the line section 2, which is formed by the circuit board 5, are medium-contacting electrodes 10, 11. These electrodes 10, 11 are located in the wall of the line section 2 and in the circuit board 5. The electrodes 10, 11 are connected with the operating electronics 14, so that a measurement signal taken from the electrodes 10, 11 can be further processed by the operating electronics 14. The operating electronics 14 is, in such case, schematically greatly simplified. For inducing a measurement voltage in the medium, a magnet system 6, 7 is provided. This magnet system 6, 7, 8, 9, 10, 11 is composed essentially of two planar coils 6, 7, which are arranged above and below the line section 2. The upper auxiliary circuit board 13 is, in such case, placed on the front side of the circuit board 5 and the lower auxiliary circuit board 12 is secured on the rear side of the circuit board 5. Furthermore, sheet material 8, 9 provides a low resistance path for the magnetic lines of force produced by the planar coils 6, 7. This sheet material 8, 9 serves also for securing the upper and lower auxiliary circuit boards 12, 13. Since the proposed flow measuring device 1 is designed only for small flow quantities, relatively low electrical currents produce the magnetic field. For example, it can be sufficient to operate the magnet system 6, 7 8, 9, 10, 11 with an electrical current of less than 85 mA.

Instead of the shown magneto inductive flow measuring device 1, which is composed of a plurality of circuit boards 5, 12, 13, it is also possible to manufacture a magneto inductive flow measuring device 1, which is composed of a single circuit board 5. In this form of embodiment, the front- and/or rear side of the circuit board 5 is provided directly with planar coils 6, 7.

The invention claimed is:
1. A flow measuring device having:
   a circuit board;
   a line section serving for guiding a flowable medium and formed at least partially by a cavity in said circuit board; and
   an operating electronics arranged on said circuit board for operating the flow measuring device, wherein:
   said circuit board is modularly constructed and includes a first module, on which said operating electronics is arranged; and said circuit board includes, furthermore, a second module, which is electrically and/or mechanically connectable with said first module, and on which said line section is located;
   on said circuit board a magnet system is provided, which is composed of planar coils, and which serves to induce a voltage in the medium flowing through said line section during operation of the flow measuring device; and
   at least two measuring electrodes are provided on said circuit board, for tapping a voltage induced in the medium.
2. The flow measuring device as claimed in claim 1, wherein:
   a measuring path serving for registering a chemical and/or physical measured variable is integrated into said line section.

3. The flow measuring device as claimed in claim 1, wherein:
said line section is formed at least partially of a cavity extending on or in said circuit board, in the form of an at least sectionally closed and/or open channel in said circuit board.

4. The flow measuring device as claimed in claim 1, wherein:
said line section is formed at least partially of an elongated opening in said circuit board.

5. The flow measuring device as claimed in claim 1, wherein:
said line section is composed essentially of said circuit board, respectively the material of said circuit board.

6. The flow measuring device as claimed in claim 1, wherein:
a coating is applied on a wall of said circuit board bounding the cavity, in order to seal said circuit board, respectively the material of the circuit board, against the medium flowing through said line section.

7. The flow measuring device as claimed in claim 1, wherein:
said circuit board is a multilayer circuit board, in the case of which conductive traces are applied on a plurality of layers of said circuit board.

8. The flow measuring device as claimed in claim 1, wherein:
on said second module, a said magnet system is provided.

9. The flow measuring device as claimed in claim 1, wherein:
said measuring electrodes are provided on said second module.

10. The flow measuring device as claimed in claim 1, wherein:
said circuit board has a front side and a rear side;
on the front side and/or the rear side electrical and/or electronic components are secured; and
said cavity forming said line section extends essentially in a plane parallel to a plane extending through the front side, respectively the rear side.

11. The flow measuring device as claimed in claim 1, wherein:
an inlet and a drain are provided on said second module, in order to introduce the medium into said line section, respectively to drain the medium from said line section.

12. The flow measuring device as claimed in claim 1, wherein:
said line section is formed of a plurality of circuit boards;
in a first circuit board a first cavity and on a second circuit board a second cavity are provided; and
said first and second circuit boards are connected in such a manner that a line section is formed, which serves for guiding the medium.

13. The flow measuring device as claimed in claim 1, wherein:
said first and second cavities form shell shaped cavities, from which said line section is composed.

14. A method for manufacture of a line section for a flow measuring device, as claimed in claim 1, which line section serves to guide a flowable medium, comprising the step of:
forming a cavity in a circuit board, which cavity is used as line section, in order to guide the flowable medium.

15. A measuring tube for a flow measuring device, as claimed in claim 1, which measuring tube includes a line section, which is formed at least partially by a cavity in a circuit board.

* * * * *